United States Patent
Darwood et al.

(10) Patent No.: US 9,473,280 B2
(45) Date of Patent: *Oct. 18, 2016

(54) TELECOMMUNICATIONS SYSTEM, APPARATUS AND METHOD FOR COMMUNICATING TO A FIRST AND A SECOND CLASS OF TERMINALS USING A FIRST AND/OR A SECOND CARRIER

(75) Inventors: Peter Darwood, Bristol (GB); Martin Beale, Bristol (GB)

(73) Assignee: SCA IPLA HOLDINGS INC., New York, NY (US)

(*) Notice: Subject to any disclaimer, the term of this patent is extended or adjusted under 35 U.S.C. 154(b) by 141 days.

This patent is subject to a terminal disclaimer.

(21) Appl. No.: 14/234,254

(22) PCT Filed: Jul. 13, 2012

(86) PCT No.: PCT/GB2012/051670
§ 371 (c)(1),
(2), (4) Date: Mar. 26, 2014

(87) PCT Pub. No.: WO2011/087288
PCT Pub. Date: Jul. 21, 2011

(65) Prior Publication Data
US 2014/0211729 A1    Jul. 31, 2014

(30) Foreign Application Priority Data
Jul. 21, 2011 (GB) .................................... 1112528.3

(51) Int. Cl.
*H04Q 7/00* (2006.01)
*H04L 5/00* (2006.01)
*H04W 72/04* (2009.01)

(52) U.S. Cl.
CPC ........... *H04L 5/0053* (2013.01); *H04L 5/0042* (2013.01); *H04L 5/001* (2013.01); *H04L 5/0037* (2013.01); *H04W 72/048* (2013.01)

(58) Field of Classification Search
CPC ..................... H04W 56/0005; H04W 72/1278
USPC .................. 370/509, 510, 511, 512, 329, 330
See application file for complete search history.

(56) References Cited

U.S. PATENT DOCUMENTS

| 8,811,433 B2* | 8/2014 | Zhao | ................. H04W 56/0005 370/510 |
| 2011/0081913 A1* | 4/2011 | Lee | ......................... H04L 5/003 455/450 |

(Continued)

FOREIGN PATENT DOCUMENTS

| CN | 101765184 A | 6/2010 |
| WO | WO 2011/041338 A2 | 4/2011 |

(Continued)

OTHER PUBLICATIONS

WO2011/041936, PCT Pub Date Apr. 14, 2011.*
U.S. Appl. No. 14/233,468, filed Jan. 17, 2014, Darwood, et al.
International Search Report issued Oct. 2, 2012, in PCT/GB2012/051670.
Great Britain Search Report issued Nov. 17, 2011, in Patent Application No. GB1112528.3.

(Continued)

*Primary Examiner* — Chuong T Ho
(74) *Attorney, Agent, or Firm* — Oblon, McClelland, Maier & Neustadt, L.L.P.

(57) ABSTRACT

A telecommunications system communicating data to/from one or more terminals and a network, including one or more transmitters operable to transmit first and second carriers over respective first and second frequency bandwidths. During a first time period the transmitters can transmit data receivable by first and second classes of terminals on the first and second carriers. During a second different time period, the transmitters can transmit data to the second terminal class on the first and second carriers in combination. A data transmission format on the first carrier is incompatible with a user data transmission format on the second carrier, during the first time period, and the transmitters can transmit control data on the first carrier in the first time period receivable by the second terminal class to enable the second terminal class to maintain synchronization with the first carrier during the first time period.

18 Claims, 7 Drawing Sheets

(56) References Cited

U.S. PATENT DOCUMENTS

| | | |
|---|---|---|
| 2011/0170515 A1 | 7/2011 | Kim |
| 2011/0199905 A1* | 8/2011 | Pinheiro ............... H04W 4/005 370/235 |
| 2012/0218987 A1* | 8/2012 | Zhao ................. H04W 56/0005 370/350 |
| 2013/0010768 A1 | 1/2013 | Lee et al. |
| 2014/0161112 A1* | 6/2014 | Darwood .......... H04W 72/1278 370/336 |

FOREIGN PATENT DOCUMENTS

| | | |
|---|---|---|
| WO | WO 2011/077292 A1 | 6/2011 |
| WO | WO 2011/087288 A2 | 7/2011 |
| WO | WO 2013/000814 A2 | 1/2013 |

OTHER PUBLICATIONS

"Proposal for a study item in support of low complexity LTE devices for MTC", 3GPP TSG RAN WG2 Meeting #74, IP Wireless Inc., R2-112974, XP 050491013, May 9-13, 2011, 5 pages.

"Clarification on Required Functionality for Key Issue-Time Controlled", CATT, 3GPP TSG SA WG2 Meeting #79, TD S2-102143, XP 050434780, May 10-14, 2010, 2 pages.

Combined Chinese Office Action and Search Report issued Oct. 27, 2015 in Patent Application No. 201280036245.9 (with English language translation of categories of cited documents).

Japanese Office Action issued Apr. 5, 2016 in Patent Application No. 2014-520719.

* cited by examiner

TELECOMMUNICATIONS SYSTEM, APPARATUS AND METHOD FOR COMMUNICATING TO A FIRST AND A SECOND CLASS OF TERMINALS USING A FIRST AND/OR A SECOND CARRIER

CROSS-REFERENCE TO RELATED APPLICATIONS

The present application is based on PCT filing PCT/GB2012/051670 filed Jul. 13, 2012, and further claims priority to British Patent Application 1112528.3 filed in the UK IPO on Jul. 21, 2011, the entire contents of each of which are incorporated herein by reference.

TECHNICAL FIELD

The present invention relates to systems, methods and apparatus for communicating data to and from terminals in mobile telecommunication networks.

BACKGROUND

Attention is often drawn to the development of fourth generation mobile telecommunication networks, such as those based on the 3GPP defined Long Term Evolution (LTE) architecture, due to the increased data rates that these advanced networks make available. For example, with the enhanced radio interface and transmission techniques provided by LTE, users will be able to enjoy mobile applications, such as video streaming and online gaming, that would previously only have been available via a fixed line connection.

However, along with high bandwidth applications, another a class of applications is currently being developed which, rather than taking advantage of high data rates, instead seeks to take advantage of the robust radio interface and increased coverage area made possible by fourth generation mobile telecommunications technology. Examples include so-called machine type communication (MTC) applications. MTC applications are typified by reduced complexity semi-autonomous or autonomous devices communicating small amounts of data on a relatively infrequent basis. Examples include so-called smart meters which, for example, may be located in a customer's house and periodically transmit information back to a central MTC server relating to the customer's consumption of a utility such as gas, water, electricity and so on.

Deploying an entirely independent MTC type network using fourth generation mobile telecommunications architecture would likely be uneconomic, at the very least due to the cost of a license allowing access to a suitable carrier (i.e. a designated section of the frequency spectrum reserved for the operation of the network which a regulator allocates to network operators). A more practical approach is to deploy an MTC type network within a conventional fourth generation network which is otherwise used to support more conventional communication devices (e.g. mobile phones, data cards, smart phones and so on).

However, simply deploying MTC type devices in a conventional fourth generation mobile telecommunication network is unlikely to be very efficient. For example, MTC type devices operating in a network would be expected to generate a high volume of random access requests in proportion to the total amount of data transmitted. Transmission of the associated signalling data would use a great deal of uplink and downlink radio resource and also consume valuable network processing capacity. If significant numbers of MTC devices were deployed, this could well reduce the network resources available for other users of the network and thus result in a reduction in the available quality of service. Moreover, data delivery for many MTC applications is not time critical (i.e. delays in the transmission of MTC data can be tolerated). On the other hand, many other applications do involve time critical data delivery such as voice calls or video streaming. Thus network resource could well be consumed transmitting non-time critical data from MTC devices at the expense of time critical data transmission by other users.

Accordingly, it is desirable to provide a technique that allows an MTC type network to be integrated with a conventional fourth generation mobile telecommunication network without having a substantially adverse effect on the quality of service available to non-MTC devices in the network.

SUMMARY OF INVENTION

In accordance with a first aspect of the invention there is provided a telecommunications system for communicating data to and from one or more terminals and a network. The system comprises one or more transmitters operable to transmit a first carrier over a first frequency bandwidth and to transmit a second carrier over a second frequency bandwidth. During a first time period the one or more transmitters are operable to transmit data receivable by a first class of terminal on the first carrier and to transmit data receivable by a second class of terminal on the second carrier. During a second time period outside the first time period, the one or more transmitters are operable to transmit data to the second class of terminal on the first and second carriers in combination. A transmission format for data on the first carrier in the first time period is incompatible with a transmission format for data on the second carrier during the first time period, and the one or more transmitters are operable to transmit control data on the first carrier in the first time period which is receivable by the second class of terminal to enable the second class of terminal to maintain synchronisation with the first carrier during the first time period.

In fourth generation mobile telecommunication networks, such as those based on the 3GPP defined Long Term Evolution (LTE) architecture, advanced features are provided which enhance the radio interface between base stations and mobile terminals (i.e. terminal devices) operating in the network. In LTE, an example of such a feature is carrier aggregation. When carrier aggregation functionality is enabled in an LTE network, during normal operation data is communicated to and from a mobile terminal using a conventional primary carrier. However, if a need arises to increase the bandwidth available to a mobile terminal, for example to transmit an unusually large amount of data to the mobile terminal over a short period of time, an additional carrier can be allocated for communicating data to that mobile terminal. This additional carrier is "aggregated" with the primary carrier, temporarily increasing the bandwidth available for communication of data to or from the mobile terminal.

In accordance with the present invention it has been recognised that this known carrier aggregation technique can be exploited to advantageously integrate an MTC type network into a conventional LTE type network.

In accordance with the present invention, the additional carrier that is used to implement carrier aggregation in an LTE network can be time multiplexed between use for the transmission of LTE data using carrier aggregation (i.e. being aggregated with the main carrier when the need arises in the LTE network) and for the transmission of MTC type data in an MTC type network. Thus, during a first time period in which the MTC type data is transmitted on the additional carrier, the transmission format of the user data transmitted on the additional carrier may be different to (i.e. incompatible with) the user data transmitted on the primary carrier. Alternatively or additionally the transmission format of the allocation signalling (PDCCH (Physical Downlink Control Channel) in the case of LTE) used for MTC type data may be different to the transmission format of the allocation signalling used for LTE data. However, during periods outside of the first time period (i.e. when both the primary carrier and the additional carrier are used for LTE data), the transmission format of the user data or allocation signalling will be the same (i.e. compatible) on both carriers.

This technique allows MTC type mobile terminals to communicate data using a carrier resource from a conventional LTE network (i.e. the additional carrier otherwise used for carrier aggregation) whilst reducing the likelihood of MTC mobile terminals reducing the quality of service available to the LTE mobile terminals by consuming a disproportionate amount of network resource. This is because the additional carrier is used for the transmission of MTC type data thereby ensuring that the primary carrier is always available for the transmission of LTE data.

Moreover, the additional carrier when being used to transmit MTC type data (i.e. the first time period) is transmitted with control data that ensures that LTE mobile terminals (i.e. devices of the second class) are able to stay synchronised with the additional carrier (the first carrier). In this way it remains "transparent" to conventional LTE mobile terminals that the additional carrier is being used for the transmission of MTC type data rather than carrier aggregation because the LTE mobile terminals are able to continue to monitor the additional carrier at all times. Advantageously, the only impact on conventional LTE mobile terminals during periods in which the additional carrier is used for the transmission of MTC type data is a temporary inability to be scheduled with resources on an additional (aggregated) carrier. As the use of carrier aggregation is typically determined by a scheduler in an eNode B, based upon measurements provided by the user terminal, scheduler rules and so on, this does not impact on the operation of the LTE mobile terminals.

In accordance with a second aspect of the invention, there is provided a method of communicating data to and from one or more mobile terminals on a first carrier transmitted over a first frequency bandwidth and a second carrier transmitted over a second frequency bandwidth. The method comprises during a first time period transmitting data receivable by a first class of terminal on the first carrier and transmitting data receivable by a second class of terminal on the second carrier and during a second time period outside the first time period transmitting data to the second class of terminal on the first and second carriers in combination. A transmission format for data on the first carrier in the first time period is incompatible with a transmission format for data on the second carrier during the first time period. Control data is transmitted on the first carrier in the first time period which is receivable by the second class of terminal to enable the second class of terminal to maintain synchronisation with the first carrier during the first time period.

In accordance with a third aspect of the invention, there is provided a base station for communicating data to and from one or more terminals and a network in a telecommunications system in which a first carrier is transmitted over a first frequency bandwidth and a second carrier is transmitted over a second frequency bandwidth. The base station comprises a transmitter operable to transmit at least the first carrier over the first frequency bandwidth. During a first time period the transmitter is operable to transmit data receivable by a first class of terminal on the first carrier. A transmission format for data on the first carrier in the first time period is incompatible with a transmission format for data on the second carrier during the first time period and the transmitter is operable to transmit control data on the first carrier in the first time period which is receivable by a second class of terminal to enable the second class of terminal to maintain synchronisation with the first carrier during the first time period.

In accordance with a fourth aspect of the invention there is provided a terminal device for use in a telecommunications system in which a first carrier is transmitted over a first frequency bandwidth and a second carrier is transmitted over a second frequency bandwidth. During a first time period the terminal device is operable to receive data on the first carrier. A transmission format for data on the first carrier in the first time period is incompatible with a transmission format for data on the second carrier during the first time period. The terminal device belongs to a first class of terminal device and control data on the first carrier in the first time period is receivable by a second class of terminal device different to the first class of terminal device to enable the terminals devices of the second class to maintain synchronisation with the first carrier during the first time period.

Various further aspects and embodiments of the invention are defined in the claims.

BRIEF DESCRIPTION OF DRAWINGS

Embodiments of the present invention will now be described by way of example only with reference to the accompanying drawings where like parts are provided with corresponding reference numerals and in which.

CONVENTIONAL LTE NETWORK

Figure 1:
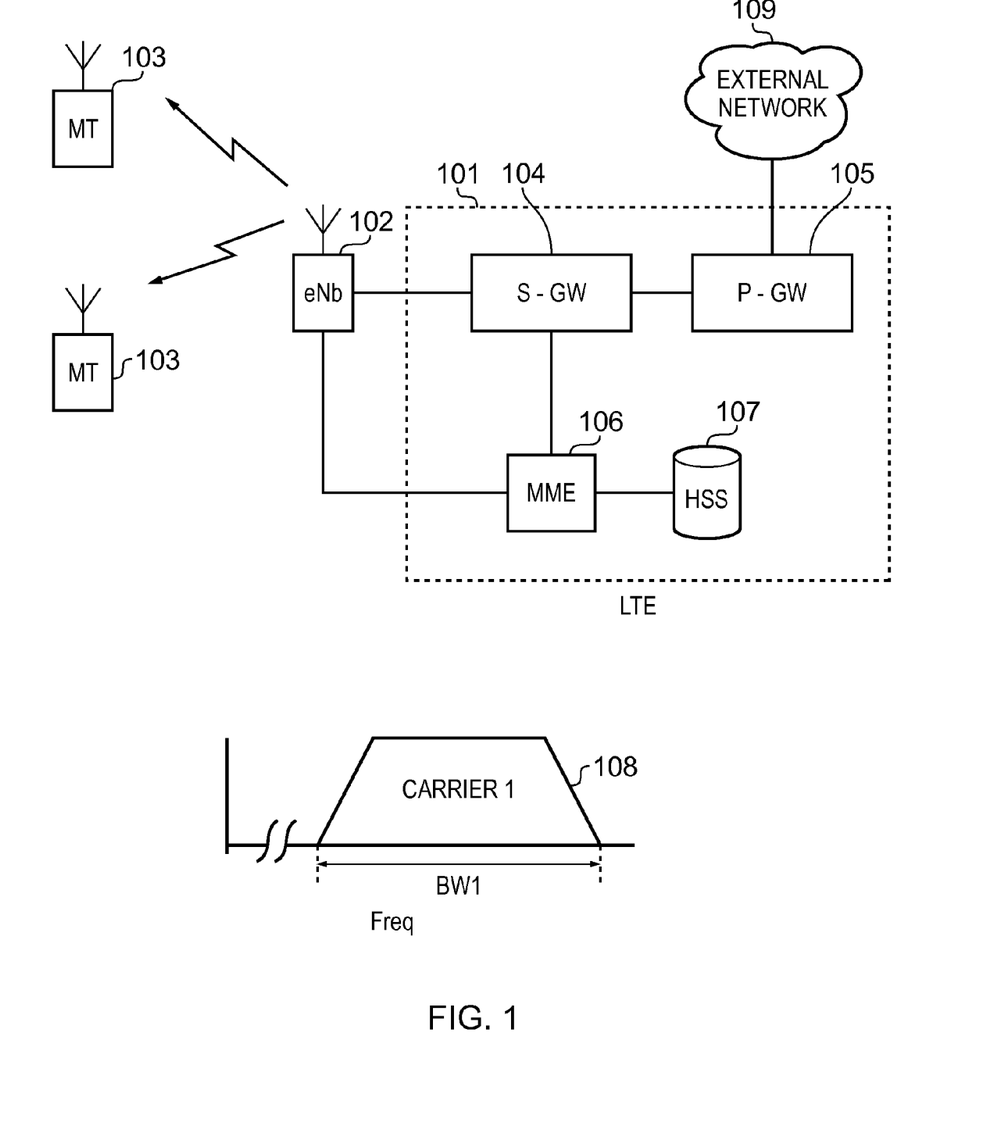
FIG. 1 provides a schematic diagram illustrating an example of a conventional Long Term Evolution (LTE) based mobile telecommunication network.

FIG. 1 provides a schematic diagram of a conventional mobile telecommunications network arranged in accordance with the Long Term Evolution (LTE) 3GPP architecture standards. The LTE network includes a core network part 101 connected to a base station 102 referred to in the art as an enhanced Node B (eNode B). The eNode B 102 is arranged to transmit data to and receive data from one or more terminals 103 via a radio interface. The terminals 103 are generally referred to as "mobile terminals" and include devices such as mobile phones, smart phones, data cards and so on. However it will be understood that the terms "terminal" and "mobile terminal" also include terminal devices that during their operation are not physically mobile (i.e. free to move between locations) but typically remain static such as smart meters and other fixed wireless devices.

The LTE core network 101 includes a serving gateway (S-GW) 104 which is arranged to route data to and from the eNode B 102. The serving gateway 104 is connected to a packet data network gateway (P-GW) 105 which routes data into and out of the LTE core network from an external network 109. The LTE core network 101 also includes a mobility management entity (MME) 106 connected to the serving gateway 104 which is responsible for authenticating mobile terminals 103 attempting to access the LTE network by retrieving subscriber profile information stored in a home subscriber server (HSS) 107. Typically the MME 106 is also connected to the eNode B 102. As is known in the art, a conventional LTE mobile telecommunication network such as that illustrated in FIG. 1 comprises further network elements, however for the sake of clarity these have been omitted.

An operator of a mobile network such as that shown in FIG. 1 is typically allocated a section of the radio spectrum on which base stations and mobile terminals belonging to that network are permitted to transmit data. For example, the LTE mobile telecommunications system shown in FIG. 1 might have allocated to it a designated section of the frequency spectrum on which data is transmitted from the eNode B 102 to the mobile terminals 103. This is illustrated in FIG. 1 which includes a schematic diagram illustrating a carrier (carrier 1) 108 which extends across a first bandwidth (BW1). In this example all data transmitted from the eNode B 102 to the mobile terminals 103 (i.e. downlink data) is transmitted on the carrier 108. As will be understood, depending on the modulation technique used, uplink data, i.e. data transmitted from the mobile terminals to the 103 to the eNode B 102, will be transmitted on a separate carrier (in the case of a frequency division duplex scheme), or on the same carrier (in the case of a time division duplex scheme).

Carrier Aggregation

As explained with reference to FIG. 1, in conventional LTE mobile telecommunication networks data is transmitted between the eNode B 102 and the mobile terminals 103 on the carrier 108 which extends across the first bandwidth BW1. Along with the quality of the radio channel, the modulation scheme employed, the presence of interference and so on, one of the factors which limits the quantity of data that can be transmitted across the radio interface between the eNode B 102 and mobile terminals 103 is the bandwidth BW1 of the carrier 108. The greater the bandwidth, the more data that can transmitted. For example, in the case of LTE this is because a greater bandwidth means a higher number of orthogonal sub-carriers can be used.

In some conventional LTE mobile telecommunication networks, such as those arranged in accordance with Release 10 of the 3GPP standards, the mobile terminals and eNode Bs can be adapted to dynamically vary the bandwidth of the carrier via which data is transmitted in order, for example, to enable a temporary increase in the quantity of data being transmitted. This is achieved by dividing the total bandwidth allocated to a mobile telecommunications operator into a number of so-called "component carriers". This concept is illustrated in FIG. 2.

Figure 2:
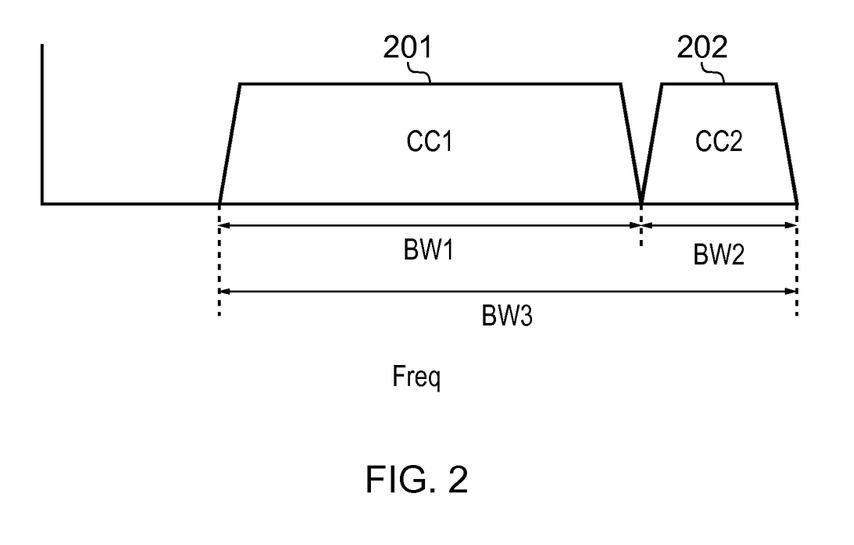
FIG. 2 provides a schematic diagram illustrating frequency allocation when using a carrier aggregation technique.

FIG. 2 provides a schematic diagram of a frequency spectrum allocation for a particular mobile telecommunications network. For the purposes of the carrier aggregation technique a first component carrier (CC1) 201 is defined which extends across a first bandwidth BW1. Also, a second component carrier (CC2) 202 is defined which extends across a second bandwidth BW2.

In accordance with the carrier aggregation technique, a mobile terminal during normal operation might receive data on or transmit data to an eNode B on the first component carrier 201. However, if there is a sudden demand for the mobile terminal to send or receive a large amount of data, for example downloading or uploading a large file or the initiation of a video streaming session, the network may permit the eNode B and/or the mobile terminal to transmit data on the radio interface using both the first component carrier 201 and the second component carrier 202. The eNode B may alternatively be in control of both carriers simultaneously and make autonomous decisions (independent of the rest of the network) about which carriers, or which groups of aggregated carriers, to assign to individual terminals.

As can be seen from FIG. 2, an aggregated bandwidth BW3 is provided which is the sum of the bandwidth of the first component carrier BW1 and the bandwidth of the second component carrier BW2.

The carrier aggregation technique described in relation to FIG. 2, in which a secondary carrier, adjacent to a primary carrier is made available to a device in order to temporarily achieve an increased bandwidth, is one of the simpler forms of carrier aggregation. However, as is known in the art, more complex variations of the technique exist. For example, in some implementations multiple secondary carriers are available with different bandwidths. Moreover, the secondary carriers need not be adjacent to the primary carrier in the frequency spectrum as is shown in FIG. 2 and can instead be spaced apart from the main carrier. However, for the sake of simplicity, carrier aggregation will be discussed with respect to the present invention in the simple form shown in FIG. 2. However, it will be understood, that the present invention can be equally well implemented using more complex versions of carrier aggregation.

Dedicated Messaging Network

A so-called dedicated messaging network (DMN) has been conceived which is a network for communicating MTC type data to and from a plurality of, typically, reduced complexity mobile terminals. The dedicated messaging network can be implemented using any suitable network architecture and radio interface but in some implementations may be preferably implemented using a network architecture and a radio interface derived from an LTE architecture. However, the transmission format used for dedicated messaging networks is typically differentiated from that of conventional mobile networks such as LTE networks in one or more of the following ways:

The radio interface may be different. LTE uses an OFDMA radio interface on the downlink and an SC-FDMA radio interface on the uplink. Both these radio interfaces employ a plurality of sub-carriers transmitted over a predetermined bandwidth. Data on the downlink is transmitted in the form of a series of consecutive frames which comprise a predetermined number of subframes (usually ten). Each subframe comprises a plurality of symbols (usually fourteen) which include a predetermined number of reference/pilot symbols. The uplink and downlink radio interfaces of the dedicated messaging network may be different to this. For example an OFDM scheme may be used, but comprising a reduced number of subcarriers and a simplified radio frame structure with different reference/pilot symbols and/or a different reference/pilot symbol density to that used in a standard LTE network.

The control signalling may be different. In conventional LTE networks, the transmission of control data is optimised for allocating large sections of uplink and downlink radio resource to a relatively small number of mobile terminals. However, DMN control signalling may be optimised for allocating smaller sections of uplink and downlink resource to a higher number of mobile terminals. In some examples this may necessitate increasing the time duration that is devoted for uplink and downlink allocations (e.g. equivalent to the LTE PDCCH). In other examples:

There may be smaller PDCCHs (where PDCCHs are encoded using a smaller number of bits than for standard LTE).

The PDCCHs may exist in different locations (different symbols) to the standard LTE PDCCHs.

The PDCCH CRC (cyclic redundancy check) size might be smaller than for standard LTE.

The DMN PDCCH bandwidth may not cover the whole of the carrier bandwidth.

The PDCCH search space in the DMN may be different to the search space for standard LTE.

The encoding of the PDCCH may be different to that for standard LTE.

The transport channel processing applied in the DMN may be different to that of standard LTE.

In LTE, the maximum bandwidth of the uplink and downlink carrier is 20 MHz. In order to permit reduced complexity transceivers to be used for DMN mobile terminals, the maximum bandwidth of the uplink and downlink carriers may be reduced.

Advanced functionality provided by LTE such as one or more of MIMO, carrier aggregation, HARQ and so on would not necessarily be enabled in the dedicated messaging network.

However, in the broadest sense, at the very least, the transmission format of the user data (i.e. data transmitted to and from the DMN mobile terminals) or allocation signalling (e.g. PDCCH) is different (i.e. incompatible) to the transmission format used in the transmission of conventional LTE data in a conventional LTE network such that an LTE mobile terminal would typically be unable to decode DMN user data and/or allocation signalling and a DMN mobile terminal would be unable to decode user data transmitted to an LTE mobile terminal.

Figure 3:
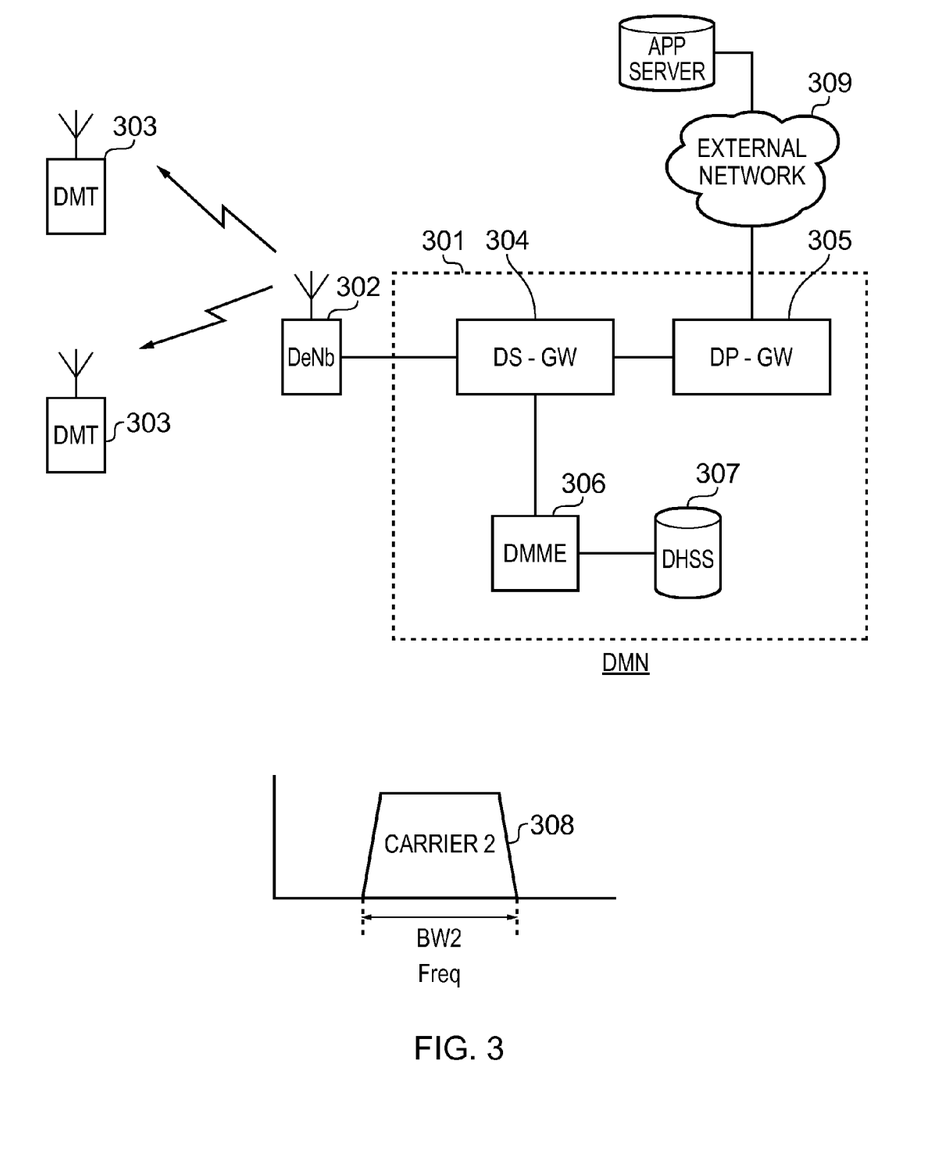
FIG. 3 provides a schematic diagram illustrating a dedicated messaging network.

FIG. 3 provides a schematic diagram illustrating a dedicated messaging network. In the example shown in FIG. 3, the dedicated messaging network comprises network components which correspond to those components of the LTE mobile telecommunications network shown in FIG. 1. Specifically, the dedicated messaging network includes DMN mobile terminals (DMT) 303 arranged to communicate data to and from a DMN eNode B (DeNode B) 302 and a DMN serving gateway (DS-GW) 304 arranged to route data to and from the DMN eNode B 302. As explained above, the DMN mobile terminals 303 shown in FIG. 3 encompass terminal devices that during their operation are not physically mobile (i.e. free to move between locations) but typically remain static such as smart meters and other fixed wireless devices. The network also includes a DMN packet gateway (DP-GW) 305 arranged to route data into and out of the DMN to and from an external network 309. The DMN also includes a DMN mobility management entity (DMME) 306 connected to a DMN home subscriber server (DHSS) 307. The functionality of these components corresponds with the corresponding network components of the LTE network shown in FIG. 1 and for the sake of brevity will not be discussed further. The functionality of these components may be integrated into the same physical entity as used for the LTE network. Data is transmitted to and received from the DMN mobile terminals 303 via a carrier 308 with a bandwidth, BW2. Typically, the bandwidth BW2 of the DMN carrier (carrier 2) is smaller than the bandwidth BW1 of the carrier (carrier 1) 108 used for transmitting data to and/or from the mobile terminals 103 shown in the LTE mobile telecommunication network in FIG. 1.

In many situations it would be impractical to implement the dedicated messaging network shown in FIG. 3 as a standalone network, not least due to the cost of a license to use the requisite carrier (i.e. carrier 2). It is therefore desirable to share some of the carrier resource used in the LTE network shown in FIG. 1. However, ideally this must be done whilst mitigating the inefficiencies that can arise by simply deploying MTC type devices along with conventional devices in an LTE network such as the disproportionate consumption of signalling resources by the MTC type devices.

Time Multiplexed Use of Component Carriers for DMN Data Transmission

Figure 4:
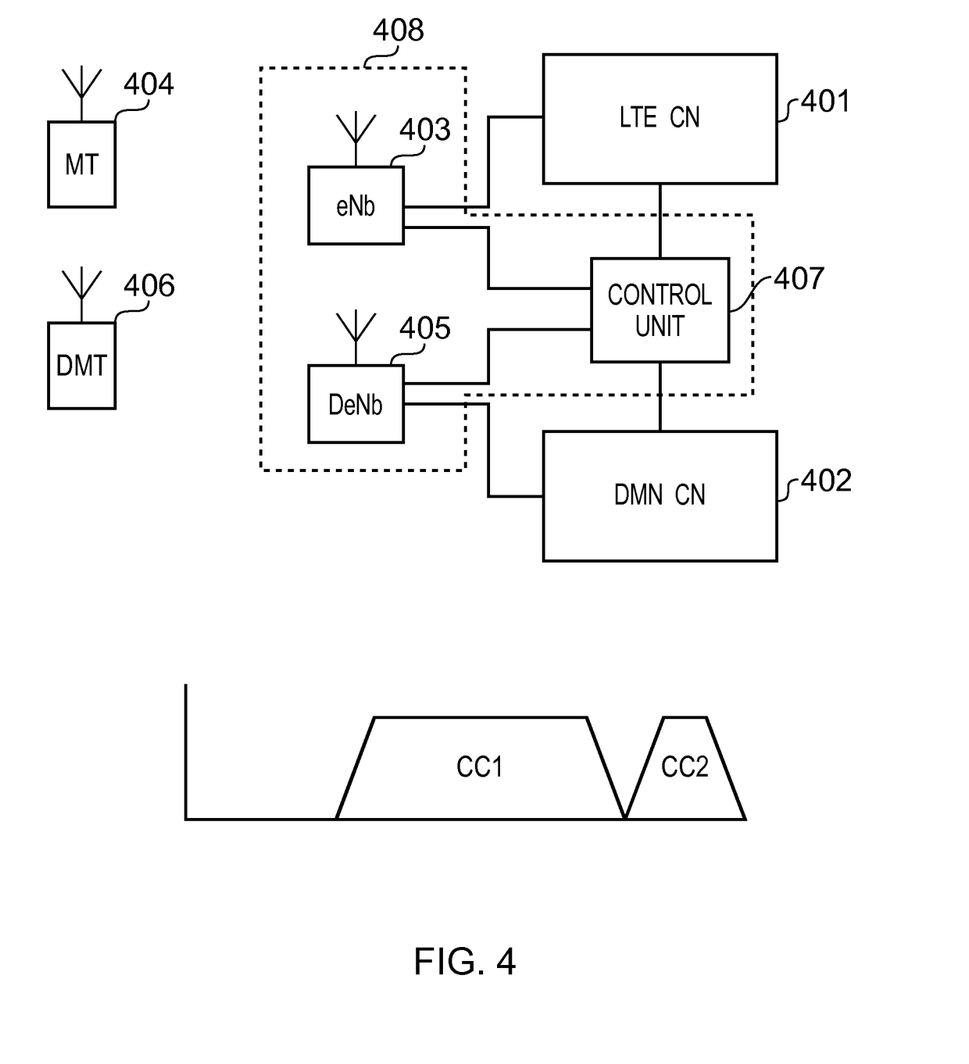
FIG. 4 provides a schematic diagram illustrating a system arranged in accordance with an example of the present invention.

FIG. 4 provides a schematic diagram illustrating a system arranged in accordance with an embodiment of the present invention. The system includes an LTE network including an LTE core network part 401 arranged in correspondence with the LTE core network 101 shown in FIG. 1. The system also includes a dedicated messaging network which includes DMN core network part 402 arranged in accordance with the DMN core network 301 shown in FIG. 3.

The LTE core network 401 is attached to an eNode B 403 which is arranged to communicate data to and from a mobile terminal 404 via a primary carrier CC1. The mobile terminal 404 is a conventional LTE mobile terminal. Correspondingly, the DMN core network 402 is attached to a DMN eNode B 405 which is arranged to communicate data to and from a DMN mobile terminal 406 via a secondary carrier CC2. In FIG. 4 the eNode B 403 and the DMN eNode B 405 are shown as separate physical entities. However, in many example implementations of the invention it is expected that the eNode B 403 and the DMN eNode B are co-located in the same physical base station, indicated in FIG. 4 by a broken line 408 encompassing both the eNode B 403 and the DMN eNode B 405. In these examples, the designation of the eNode N 403 and the DMN eNode B 405 as separate entities is purely logical, and in practice, they are implemented as a single eNode B.

The LTE core network 401, the eNode B 403 and the LTE mobile terminals 404 include carrier aggregation functionality which, as explained before, enables additional carriers to be temporarily allocated for the transmission of data to and/or from one or more of the mobile terminals. In the downlink case, during normal operation the primary carrier CC1 is allocated for the transmission of data from the eNode B 403 to the LTE mobile terminal 404. However, if the quantity of data to be transmitted to the LTE mobile terminal 404 increases, (for example a user of the LTE mobile terminal 404 starts a video streaming application which requires the transmission of high levels of data from the LTE core network 401), the secondary carrier CC2 is "aggregated" with the first carrier increasing the total bandwidth across which data is transmitted from the eNode B 403 to the LTE mobile terminal 404.

Thus, in the system shown in FIG. 4, CC2 can be used for the transmission of data from the LTE core network 401 and for the transmission of data from the DMN core network 402. In order to avoid both LTE data and DMN data being transmitted simultaneously on CC2, a control unit 407 is provided. The control unit 407 is arranged to co-ordinate when, and on what carrier, LTE data is transmitted to and from the eNode B 403 and when, and on what carrier DMN data is transmitted to and from the DMN eNode B 405. In some implementations in which both the e Node B 403 and the DMN e Node B 405 are implemented as a single physical entity, functionality associated with the control unit 407 is also located in this physical entity. Thus the broken line 408 shown in FIG. 4 also includes the control unit 407.

In one example, during certain periods the control unit 407 is arranged to control the system so as to prevent the transmission of any DMN data from the DMN eNode B 405 on CC2 and instead ensure that CC2 is reserved for carrier aggregation in the LTE network should the need arise. During other periods, the control unit 407 is arranged to permit DMN data to be transmitted using CC2. This concept is illustrated in FIG. 5.

Figure 5:
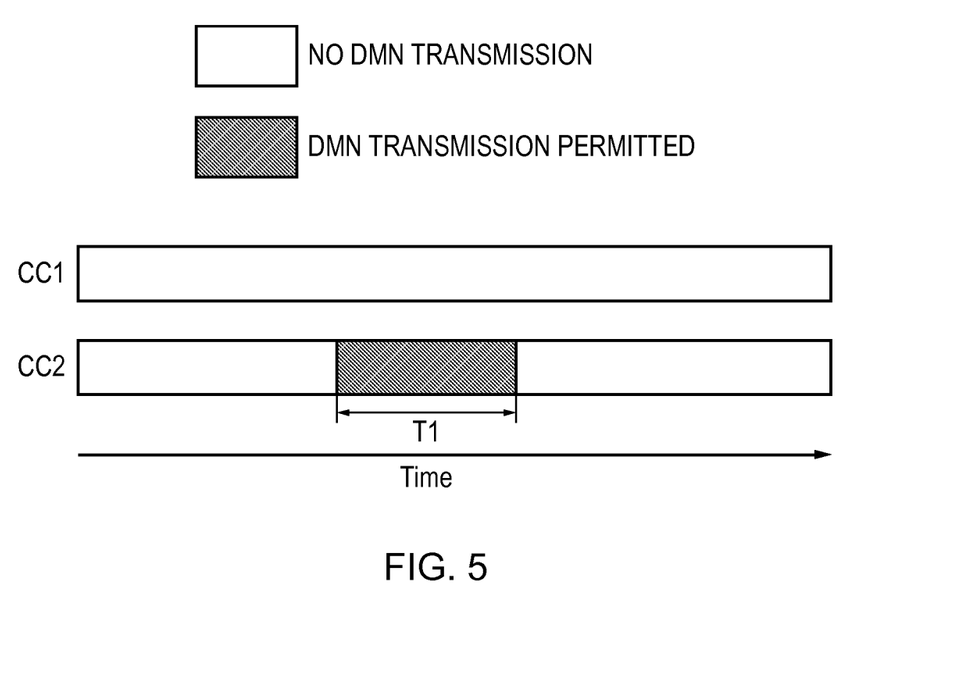
FIG. 5 provides a schematic diagram illustrating the use of two carriers with respect to time in accordance with an example of the present invention.

FIG. 5 provides a schematic diagram showing the use of CC1 and CC2 over time. As shown in FIG. 5, no DMN transmission is permitted on CC1 at any time. However, during time period $T_1$, DMN transmission is permitted on CC2. Outside of $T_1$, DMN transmission is not permitted on CC2. In this way it is ensured that there is no collision between DMN transmissions and LTE transmissions on CC2.

$T_1$ can be any suitable period of time. For example, in some scenarios it may be optimal to identify a period during which the LTE network is lightly loaded (for example between the hours of 0200 and 0400 when most human users of the network would be asleep) and arrange for $T_1$ to extend across this period. In this case T1 would last for two hours. In other scenarios, $T_1$ may be much shorter, for example it might be the first minute in every hour, or even the first thirty seconds in every five minute period. In other examples $T_1$ could be timed to correspond with the transmission of certain radio frames (described further below). Thus, in some examples $T_1$ might correspond with one or more transmission frames transmitted over a larger number of transmission frames, for example $T_1$ might extend over the final ten frames of every 100 frames transmitted. In some examples, $T_1$ may be a single subframe. As explained in more detail below, the assignment of CC2 to DMN or LTE may be dynamic, where it is controlled by a scheduler in the network (for example in the control unit 407, the eNode B 403 or the DMN eNode B 405).

As will be understood, the network components making up the system shown in FIG. 4 are merely logical designations. The LTE core network part and the DMN core network may in fact be implemented as a single core network. Furthermore, as explained above, in some examples the control unit 407, DMN eNode B 405 and the LTE eNode B 403 could be configured as a single physical base station.

Transmission of Control Information on Component Carrier during DMN Transmission Periods In order to ensure optimal backward compatibility with conventional LTE mobile terminals, and in particular mobile terminals that include conventional carrier aggregation functionality, it is desirable to ensure that the use of CC2 for the transmission of DMN data is "transparent" to conventional LTE mobile terminals. In other words, it is desirable that CC2 is transmitted in such a way that as soon as period $T_1$ finishes, CC2 is immediately available for the scheduling of carrier aggregation without a need for the LTE mobile terminals to discover or camp-on to CC2 again (the concepts of mobile terminals discovering and camping on to a carrier are well known in the art and for the sake of brevity will not be discussed in detail).

To achieve this, enough information should be transmitted on CC2 during $T_1$ to allow the LTE mobile terminals to remain synchronised with CC2. As is known in the art, when a mobile terminal is synchronised with the signal transmitted on a carrier from a base station, it is able to:

a) monitor or perform measurements on the radio channel (e.g. in terms of signal strength and signal quality), and b) perform frame tracking whereby the timing of the radio frames transmitted on the carrier can be tracked.

To allow the LTE mobile terminals to maintain synchronisation with CC2, during $T_1$, when CC2 is transmitted by the DMN eNode B 405, LTE control signals that are present on CC2 in periods outside $T_1$ are retained within the CC2 during $T_1$. In some examples these control signals include LTE reference symbols and LTE synchronisation signals. This concept is illustrated in FIG. 6a and FIG. 6b.

Figure 6A:
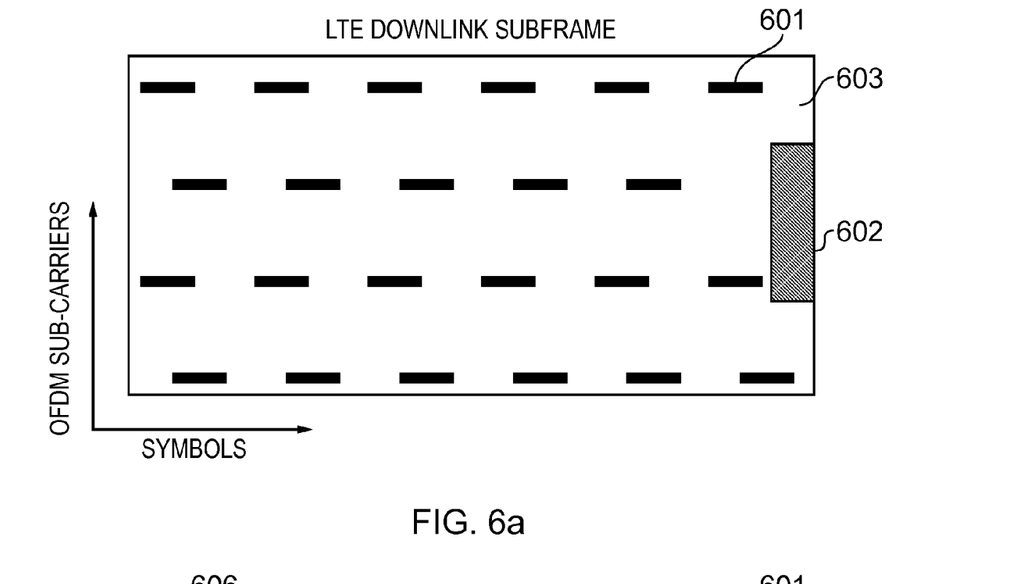
FIG. 6a provides a schematic diagram illustrating a distribution of reference symbols and a synchronisation signal in a conventional LTE downlink sub-frame.

FIG. 6a provides a simplified schematic diagram of an LTE downlink subframe 603 as is known in the art. Together, a plurality of LTE subframes (usually ten) forms an LTE frame. The subframe includes a plurality of reference symbols (i.e. pilot symbols) 601 and a synchronisation signal(s) 602. The reference symbols 601 are distributed throughout the subframe and are used by a receiving mobile terminal to estimate the channel conditions between the base station transmitter and the mobile terminal receiver. Estimating the channel conditions allows a mobile terminal to process received signals to reduce channel effects that the signal is subject to during transmission from the base station and to report measurements of channel quality to the base station. The synchronisation signal(s) 602 is a synchronisation signal that once detected allows the LTE mobile terminal to achieve or maintain frame synchronisation and determine the cell identity of the particular eNode B transmitting the downlink signal. Additionally, or alternatively, the reference signals may be employed to maintain frame synchronisation. The synchronisation signal(s) 602 is not typically transmitted on every subframe but will usually be transmitted at least once every LTE frame. The remaining parts of the LTE downlink subframe are used for the transmission of other LTE data such as user data and other control data. The subframe structure shown in FIG. 6a corresponds to that normally broadcast on CC2 during periods outside of $T_1$ when CC2 is being used for carrier aggregation. As will be understood, the LTE subframe includes additional elements such as a physical downlink control channel (PDCCH). However, for the sake of simplicity, these additional elements are not shown in FIG. 6a.

In order to assist a conventional LTE mobile terminal to stay synchronised with CC2 during $T_1$ when CC2 is being used for the transmission of DMN data, the LTE mobile terminal would ideally continue to receive the reference symbols and/or the synchronisation signal(s). FIG. 6b provides a simplified schematic diagram showing a signal transmitted on CC2 during $T_1$ in accordance with an example of the present invention. For ease of comparison, the signal shown in FIG. 6b corresponds with the subframe structure shown in FIG. 6a, however it will be understood that the signal transmitted on CC2 can take any suitable form.

Figure 6B:
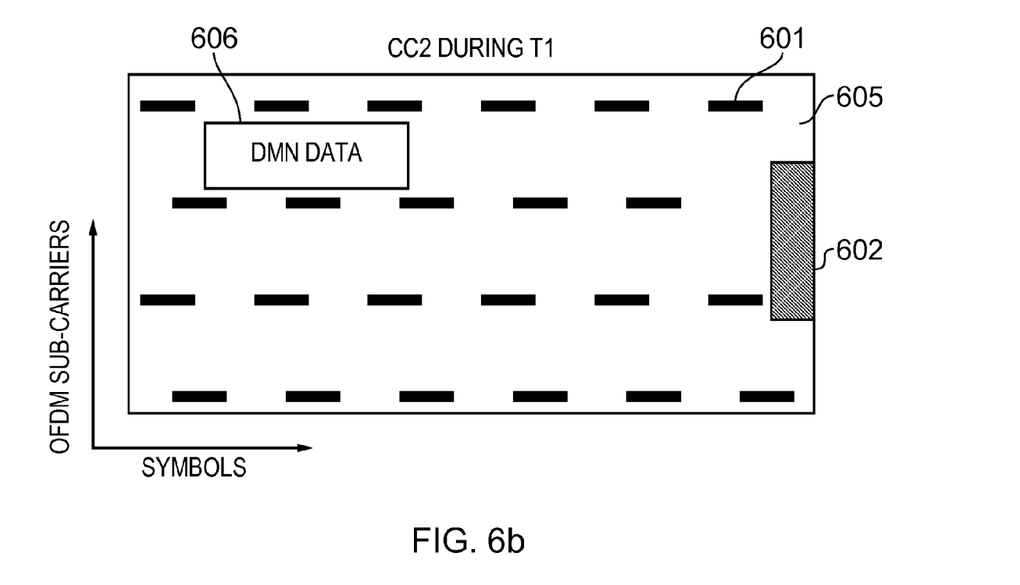
FIG. 6b provides a schematic diagram illustrating a signal transmitted on a carrier during a period in which data from a dedicated messaging network is transmitted in accordance with an example of the present invention, and FIG. 7 provides a schematic diagram of a terminal arranged in accordance with an example of the present invention.

As can be seen from FIG. 6b, in accordance with examples of the present invention, during $T_1$, CC2 is transmitted with the reference symbols 601 and a synchronisation signal(s) 602 corresponding to those transmitted on CC2 in periods outside of $T_1$, i.e. when CC2 is being used for conventional carrier aggregation. The remaining parts of the subframe 605 can be used for the transmission of DMN data. For example, FIG. 6b shows a DMN data block 606 positioned within the remaining parts of the subframe 605 that are not occupied by the reference symbols 601 and the synchronisation signal 602. In this example, the DMN data block 606 is incompatible with normal LTE operation as it doesn't span all of the symbols available for user data.

Scheduling CC2 in DMN Mode

As explained above, when CC2 is being used to transmit DMN data this is transparent to LTE mobile terminals because CC2 retains the relevant control data to ensure that LTE mobile terminals can remain synchronised with and make measurements on CC2.

However, in order to prevent DMN mobile terminals from attempting to use CC2 when it is being used for the transmission of LTE data and to enable the DMN terminals to monitor CC2 for allocation messages and to determine when random access request opportunities exist, it is desirable to provide a mechanism that enables the DMN mobile terminals to determine when CC2 is available for the transmission of DMN data, i.e. the point in time at which the period $T_1$ occurs.

Static Scheduling

In one example, a so-called static scheduling technique is employed. In this example, the DMN mobile terminals are preconfigured with scheduling information indicating a predetermined duration and predetermined time at which $T_1$ occurs. The duration could be indicated explicitly as an elapsed time relative to $T_1$ or implicitly as the end time of the use of CC2 as a DMN. This preconfigured scheduling information could be provided to the mobile terminals in any suitable way. For example, scheduling information could be stored on the USIM of each DMN mobile terminal prior to deployment in the network. Thus, in one scenario in which CC2 is switched between LTE mode (i.e. periods outside of $T_1$) to the DMN mode (i.e. during $T_1$) relatively frequently but for short periods of time, each DMN mobile terminal could be able to determine from the preconfigured scheduling information that, for example, the first 10 frames out of every 100 frames that are transmitted on CC2 will be used for the transmission of DMN data.

In another scenario in which CC2 switched between LTE mode to the DMN mode less frequently but for longer periods of time, each DMN mobile terminal could be able to determine from the preconfigured scheduling information that, for example, between the hours of 0200 and 0400 CC2 will be used for the transmission of DMN data.

Semi-Static Scheduling

In another example, a so-called semi-static scheduling technique is employed. This technique is similar to the static scheduling technique described above in that the DMN mobile terminals are provided with preconfigured scheduling information indicating the duration of $T_1$ and the time at which $T_1$ occurs. However, in this example, the preconfigured scheduling information stored on each DMN mobile terminal can be reconfigured through higher layer signalling sent from the DMN core network to the DMN mobile terminal. For example, during $T_1$, CC2 is transmitted with a DMN control channel receivable by each of the DMN mobile terminals. If there were any changes to be made to the time at which $T_1$ occurred or the duration of $T_1$, this information would be transmitted on the DMN control channel and received by each of the DMN mobile terminals. Each DMN mobile terminal would then update the stored scheduling information accordingly.

Dynamic Scheduling

In another example a dynamic scheduling technique is employed. In this example a DMN physical layer signal is used which indicates to the DMN mobile terminals that CC2 is available for the transmission of DMN data. This physical layer signal could be implemented in any suitable way, for example a DMN specific synchronisation signal inserted into frames that are transmitted during $T_1$. In this example the DMN mobile terminals are arranged to periodically or constantly monitor CC2 and if the DMN specific synchronisation signal is detected, the DMN mobile terminals are alerted to the fact that CC2 is available for the transmission of DMN data. Alternatively, the spare bits on the master information block (MIB) carried on the physical broadcast channel (PBCH), could be used to indicate that CC2 is available for the transmission of DMN data. This mode would be appropriate when the transmission format of the PBCH is compatible with both the LTE terminals and the DMN terminals. For LTE releases up to and including Release 10, there are ten spare bits on the MIB that a conventional LTE mobile terminal would ignore. As such, it could be signalled to a DMN mobile terminal that a DMN exists using one or more of these MIB bits.

In some embodiments, it is not necessary to signal to DMN mobile terminals whether the DMN is active or not. In these embodiments, the DMN mobile terminal will attempt to decode the sub-frame and will only successfully decode allocations when the DMN is indeed active.

In the uplink, a DMN mobile terminal can request DMN uplink resources when the downlink DMN is inactive by sending a random access channel (RACH) request in the LTE uplink of CC2. Typically, a network element such as the control unit 407 is arranged to control the communication of scheduling information to the DMN mobile terminals.

In order to facilitate the scheduling techniques described above, in some examples the DMN mobile terminals include a scheduling unit operable to determine a time at which the first time period occurs and a duration of the first time period. The duration could be indicated explicitly as an elapsed time or implicitly as the end time of the use of CC2 as a DMN. This is shown in FIG. 7.

Figure 7:
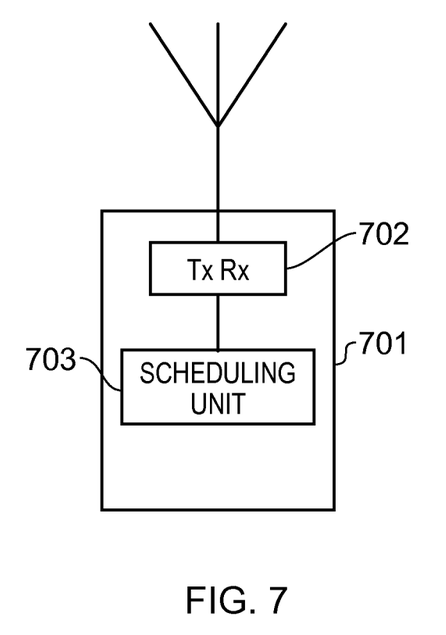

FIG. 7 provides a schematic diagram of a DMN terminal 701 arranged in accordance with an example of the present invention. The DMN terminal 701 includes a transceiver unit 702 for transmitting and receiving data from the base stations. The transceiver unit 702 is connected to a scheduling unit 703. When employing the static scheduling technique described above, the scheduling unit 703 is operable to determine the time at which the first time period occurs and the duration of the first time period based on preconfigured information stored in the scheduling unit 703. When employing the dynamic scheduling technique described above, the scheduling unit 703 is operable to determine the time at which the first time period occurs and optionally the duration of the first time period based on scheduling information transmitted on the CC2 for example based on bits in the MIB as described above.

Switching Between DMN Mode and LTE Mode on CC2

In the examples described above in which the transition between LTE mode and DMN mode is undertaken on a semi-static basis or a fully dynamic basis, typically the scheduling will be co-ordinated by a network element common to both the LTE core network and the DMN core network such as the control unit 407 shown in FIG. 4. In some examples the scheduling of the use of CC2 for either LTE or DMN data transmission will be done on an arbitrary basis, for example to reflect a scheduling pattern input to the control unit by a network operator. This might be the case where CC2 is arranged to transmit DMN data over a predetermined period of hours during the night, or to transmit data during every tenth frame and so on. However, in other examples, the scheduling of the use of CC2 may be adapted dynamically in response to certain conditions in the network. For example, in some scenarios, the control unit 407 may be arranged to monitor traffic loading in one or more of the network elements of the LTE network and/or one or more elements of the DMN, or receive monitoring data corresponding to traffic loading in the network elements of the LTE of DMN network. For example, when the traffic drops below a threshold level, the control unit 407 can be arranged to switch CC2 from transmitting LTE data to transmitting DMN data. When the traffic loading exceeds the threshold level again and/or once a predetermined period of time has elapsed, the control unit controls the network to begin transmitting LTE data on CC2.

In another example, the control unit may be arranged to receive data indicating the presence of DMN mobile terminals within the network and arrange to switch CC2 to DMN mode in response. In some examples this is achieved by arranging the base station operating on CC2 to decode random access preamble transmissions from DMN mobile terminals irrespective of whether CC2 was operating in LTE or DMN mode.

DMN and LTE Data Transmission in the Uplink

So far examples of the present invention have been described mainly in terms of the downlink, with reference to data being communicated from the DMN to the DMN mobile terminals and from the LTE network to the LTE mobile terminals. In these examples, CC2 is used for downlink carrier aggregation or for transmitting downlink DMN data.

However, it will be understood that the concept of alternating between using a secondary carrier for carrier aggregation in an LTE system and for the transmission of DMN data can also be applied to the uplink. In uplink carrier aggregation, access to uplink component carriers is scheduled by the network in a similar way as access to the downlink component carrier. The network may assign aggregated component carriers to a terminal based on scheduling decisions determined using buffer status reports and channel quality measurements. The network then schedules the mobile terminal to access the additional component carrier and sends an appropriate allocation message to that mobile terminal.

Various modifications may be made to the embodiments hereinbefore described. For example, embodiments of the present invention have been described with reference to an implementation which uses a mobile radio network operating in accordance with the 3GPP Long Term Evolution (LTE) standard. However it will be understood that the principles of the present invention can be implemented using any suitable radio telecommunications technology and using any suitable network architecture in which carrier aggregation could be employed.

Furthermore, it will be understood that the particular component parts of which the system described above is comprised, for example the various network components such as the control unit and the eNode Bs and the DMN eNode Bs are in some examples logical designations. Accordingly, the functionality that these component parts provide may be manifested in ways that do no conform precisely to the forms described above and shown in the diagrams. For example aspects of the invention may be implemented in the form of a computer program product comprising instructions (i.e. a computer program) that may be implemented on a processor stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

The invention claimed is:

1. A telecommunications system for communicating data to and from one or more terminals and a network, the system comprising:
   one or more transmitters operable to transmit a first carrier over a first frequency bandwidth and to transmit a second carrier over a second frequency bandwidth, wherein
   during a first time period the one or more transmitters are operable to transmit dedicated messaging network (DMN) data receivable by a machine-type communication (MTC) class of terminal on the first carrier and to transmit data receivable by a second class of terminal having a complexity greater than the MTC class of terminal on the second carrier,
   during a second time period outside the first time period, the one or more transmitters are operable to transmit data to the second class of terminal on the first and second carriers in combination,
   a transmission format for data on the first carrier in the first time period is incompatible with a transmission format for data on the second carrier during the first time period, and
   the one or more transmitters are operable to transmit control data on the first carrier in the first time period which is receivable by the second class of terminal to enable the second class of terminal to maintain synchronization with the first carrier during the first time period.

2. The telecommunications system of claim 1, wherein the control data comprises reference symbols from which a channel estimation can be determined and a synchronization signal enabling a terminal of the second class to achieve synchronization to the second carrier.

3. The telecommunications system of claim 1, wherein a time at which the first time period occurs and a duration of the first time period are predetermined and the terminals of the MTC class are preconfigured with information corresponding to the predetermined time and duration of the first time period.

4. The telecommunications system of claim 1, further comprising:

circuitry arranged to set a time at which the first time period occurs and a duration of the first time period and to communicate these to the terminals of the MTC class.

5. The telecommunications system of claim 4, wherein the circuitry is arranged to set the time at which the first time period occurs and the duration of the first time period in response to traffic loading detected in one or more network elements of the telecommunications system.

6. The telecommunications system of claim 4, wherein the circuitry is arranged to set the time at which the first time period occurs and the duration of the first time period in response to a detection of terminals of the MTC first class.

7. The telecommunications system of claim 1, further comprising:
  circuitry arranged to
    set the first time period by controlling the time at which the one or more transmitters are operable to transmit data receivable by the MTC class of terminal on the first carrier and operable to transmit data receivable by the second class of terminal on the second carrier, and
    set the second time period by controlling the time at which the one or more transmitters are operable to transmit data to the second class of terminal on the first and second carriers in combination, wherein
  the first time period and second time period are set on a subframe by subframe basis.

8. The telecommunications system of claim 5, wherein the one or more network elements comprise one or more LTE network elements for transmitting data on the first and second carriers and one or more network elements of a DMN for supporting MTC data transmission and for transmitting the DMN data on the first carrier.

9. The telecommunications system of claim 2, wherein the one or more transmitters are operable to transmit data to the second class of terminal on the first carrier in combination with the second carrier in accordance with a 3GPP defined carrier aggregation technique.

10. A method of communicating data to and from one or more terminals and a network in a telecommunications system on a first carrier transmitted over a first frequency bandwidth and a second carrier transmitted over a second frequency bandwidth, the method comprising:
  during a first time period transmitting dedicated messaging network (DMN) data receivable by a machine-type communication (MTC) class of terminal on the first carrier and transmitting data receivable by a second class of terminal having a complexity greater than the MTC class of terminal on the second carrier; and
  during a second time period outside the first time period, transmitting data to the second class of terminal on the first and second carriers in combination, wherein
  a transmission format for data on the first carrier in the first time period is incompatible with a transmission format for data on the second carrier during the first time period, and wherein control data is transmitted on the first carrier in the first time period which is receivable by the second class of terminal to enable the second class of terminal to maintain synchronization with the first carrier during the first time period.

11. The method of claim 10, wherein
the control data comprises reference symbols from which a channel estimation can be determined and a synchronization signal enabling a terminal of the second class to achieve synchronization to the second carrier.

12. The method of claim 10, wherein
a time at which the first time period occurs and a duration of the first time period are predetermined and the terminals of the MTC class are preconfigured with information corresponding to the predetermined time and duration of the first time period.

13. The method of claim 10, further comprising:
detecting traffic loading in one or more network elements of the telecommunications system;
setting a time at which the first time period occurs and a duration of the first time period in accordance with the detected traffic loading; and
communicating the time at which the first time period occurs and the duration of the first time period to terminals of the MTC class.

14. The method of claim 10, further comprising;
detecting terminals of the MTC class;
setting a time at which the first time period occurs and a duration of the first time period in response to the detection of the terminals of the MTC class and
communicating the time at which the first time period occurs and a duration of the first time period to terminals of the MTC class.

15. The method of claim 13, wherein
a time at which the first time period occurs and a duration of the first time period are set on a subframe by subframe basis.

16. The method of claim 13, wherein
the one or more network elements comprise one of more LTE network elements for communicating data on the first and second carriers and one or more network elements of a DMN for supporting MTC data transmission and for communicating the DMN data on the second carrier.

17. The method of claim 10, further comprising:
transmitting data to terminals of the second class on the first carrier in combination with the second carrier in accordance with a 3GPP defined carrier aggregation technique.

18. A base station for communicating data to and from one or more terminals and a network in a telecommunications system in which a first carrier is transmitted over a first frequency bandwidth and a second carrier is transmitted over a second frequency bandwidth, the base station comprising—
  a transmitter operable to transmit at least the first carrier over the first frequency bandwidth, and
  during a first time period the transmitter is operable to transmit dedicated messaging network (DMN) data receivable by a machine-type communication (MTC) class of terminal on the first carrier,
  a transmission format for the DMN data on the first carrier in the first time period is incompatible with a transmission format for data on the second carrier during the first time period, and
  the transmitter is operable to transmit control data on the first carrier in the first time period which is receivable by a second class of terminal having a complexity greater than the MTC class of terminal to enable the second class of terminal to maintain synchronization with the first carrier during the first time period;
  during a second time period outside the first time period, transmitting data to the second class of terminal on the first and second carriers in combination.

* * * * *